(12) United States Patent
Wurr (10) Patent No.: US 12,220,356 B2
(45) Date of Patent: Feb. 11, 2025

(54) BICYCLE RESCUE DEVICE

(71) Applicant: Philippe S. Wurr, Phoenix, AZ (US)

(72) Inventor: Philippe S. Wurr, Phoenix, AZ (US)

( * ) Notice: Subject to any disclaimer, the term of this patent is extended or adjusted under 35 U.S.C. 154(b) by 634 days.

(21) Appl. No.: 17/563,770

(22) Filed: Dec. 28, 2021

(65) Prior Publication Data

US 2023/0201050 A1    Jun. 29, 2023

(51) Int. Cl.
*A61G 1/06* (2006.01)
*B62J 9/00* (2020.01)
*B62J 11/00* (2020.01)
*B62J 50/00* (2020.01)
*B62K 11/00* (2006.01)

(52) U.S. Cl.
CPC ...... *A61G 1/06* (2013.01); *B62J 9/00* (2013.01); *B62J 11/00* (2013.01); *B62J 50/00* (2020.02); *B62K 11/00* (2013.01)

(58) Field of Classification Search
CPC ....... B62J 11/00; B62J 9/00; B62J 9/22; B62J 9/27; B62J 1/14; B62J 7/04; A61G 1/06; A61G 1/044; A61G 2220/02; A61G 2220/18; A61G 1/0293
USPC ............ 280/30, 288.4, 290, 202, 7.16, 7.17; 224/415, 417, 426, 427, 442, 452
See application file for complete search history.

(56) References Cited

U.S. PATENT DOCUMENTS

| | | | |
|---|---|---|---|
| 660,769 A | 10/1900 | Getz | |
| 3,329,323 A * | 7/1967 | Tanaka | B62J 11/05 224/457 |
| 3,338,484 A * | 8/1967 | Hall, Sr. | B62J 11/05 224/450 |
| 3,547,325 A * | 12/1970 | Hill | B62J 11/05 224/450 |
| 3,873,127 A * | 3/1975 | McNichol, Jr. | B62J 1/28 297/215.12 |
| 7,549,661 B2 | 6/2009 | Jackson et al. | |
| 11,884,351 B2 * | 1/2024 | Seguin | B62H 1/00 |
| 2013/0292438 A1 * | 11/2013 | Armstrong | B62J 9/24 224/447 |
| 2021/0244581 A1 * | 8/2021 | Anderson | A61G 1/0275 |

FOREIGN PATENT DOCUMENTS

| | | |
|---|---|---|
| CN | 201951628 U | 10/2010 |
| CN | 204636750 U | 9/2015 |
| CN | 105151189 A | 12/2015 |
| CN | 206526187 U | 9/2017 |
| DE | 202015002791 U1 | 7/2015 |
| FR | 471501 A * | 10/1914 |
| GR | 1009945 B | 3/2021 |

OTHER PUBLICATIONS

FR471501 English translation (Year: 1914).*

* cited by examiner

*Primary Examiner* — Anne Marie M Boehler
(74) *Attorney, Agent, or Firm* — Thomas W. Galvani, P.C.; Thomas W. Galvani (57) ABSTRACT

A bicycle rescue device includes a bicycle frame with front and rear wheels mounted for rotation thereto and a seat tube. A first mount is received in the seat tube, and a carriage is mounted in the first mount. The carriage is configured to hold a rescue basket. A second mount is disposed over the rear wheel, and the second mount presents an upper support surface and includes straps for securing the rescue basket.

16 Claims, 7 Drawing Sheets

BICYCLE RESCUE DEVICE

FIELD

The present specification relates generally to emergency equipment, and more particularly to backcountry rescue equipment.

BACKGROUND

First responders provide immediate, on-site, medical attention in emergency situations. They frequently have to transport a patient before they or others can provide more thorough medical attention. In urban areas, ambulances are often the most expedient way to get that medical attention. In rural areas, ambulances or helicopters may be effective.

However, in backcountry settings, where a patient is injured far from paved or dirt roads, the patient often needs to be moved to a location with better helicopter or ambulance access. For example, in heavily wooded areas, a patient may need to be transported for several miles before reaching a clearing where a helicopter can land or hover. As another example, in the desert, the patient may need to be carried over undulating, rugged hills or river beds that an ambulance could not cross.

In such situations, first responders currently have few options. Carrying a person over terrain is extremely difficult. A patient is almost always laid into a rescue basket or stretcher which is then conveyed under human power. Two to six rescue firefighters may carry the person in the rescue basket, but this quickly becomes exhausting work. Four first responders are preferred, so that each can handle a corner of the rescue basket; this still leaves thirty to forty pounds of patient weight to carry per responder.

Trail wheels, or litter wheels, are another option for conveying a patient. Litter wheels are very large, rugged single wheels with a support structure for carrying the rescue basket above the wheel. Litter wheels are helpful in overcoming large or oddly-shaped obstacles and can be incredibly efficient when rolling over fairly flat surfaces. However, they are unstable and require four people to handle. When a rescue basket carried on a litter wheel starts to tip, all four rescuers have to respond to prevent the tip from turning into a full toppling of the rescue basket. As such, in some rescue situations, litter wheels can be quite dangerous. An improved rescue device is needed.

SUMMARY

In an embodiment, a bicycle rescue device includes a bicycle frame with front and rear wheels mounted for rotation thereto and a seat tube. A first mount is received in the seat tube, and a carriage is mounted in the first mount. The carriage is configured to hold a rescue basket. A second mount is disposed over the rear wheel, and the second mount presents an upper support surface and includes straps for securing the rescue basket.

In embodiments, the bicycle frame carries a motor for driving at least one of the front and rear wheels. The first mount includes a seat post, a first support surface fixed normal to the seat post, and means for securing a carriage against the first support surface when the carriage is placed atop the first support surface, the carriage configured to carry the rescue basket. The means for securing the carriage includes a catch lip on one end of the first support surface and a latch on an opposed end of the first support surface, the latch pivoted on a cam assembly. The means for securing the carriage further includes an upstanding lip on an opposing end of the first support surface, the lip defining a gap through which the latch pivots on the cam assembly. The means for securing the carriage further includes an upstanding lip at an opposing end of the first support surface, cooperating with the catch lip and the first support surface to define a hold for receiving the carriage on the first mount. The carriage includes two opposed, spaced-apart bunks, each bunk including a U-shaped body having a support base and opposed support sides extending upwardly from the support base.

In another embodiment, a rescue basket mount kit is for mounting to a bicycle and carrying a rescue basket thereon, wherein the bicycle including a seat tube and a pannier rack. The mount kit includes a first mount having a seat post, a first support surface fixed to the seat post and normal thereto, and first means for securing the rescue basket with respect to the first support surface. A second mount includes a base having a catch to engage the pannier rack, a second support, and second means for securing the rescue basket against the second support surface.

In embodiments, the second mount includes a base having a front end and an opposed rear end, a curved lip at the front end defining the catch, configured to receive a crossbar of the pannier rack, and a latch plate under the rear end, configured to bind the pannier rack against the base of the rear mount. The second means includes a strap terminating in a clasp for securing against the rescue basket when the rescue basket is placed atop the second support surface. The first support surface of the first mount includes an upstanding lip at one end and a catch lip at an opposing end. The catch lip includes an upstanding endwall and an overhanging lip projecting over the first support surface. The first means includes a cam assembly and a latch on the cam assembly for securing a carriage to the first mount when the carriage is placed atop the first support surface of the first mount, the carriage configured to hold the rescue basket.

In another embodiment, a bicycle rescue device is for carrying a rescue basket on a bicycle frame having a seat post, a pannier rack, and being supported on at least a front wheel and a rear wheel. The bicycle rescue device includes a forward mount applicable to the seat tube, wherein the forward mount includes a seat post, a horizontal support for supporting the rescue basket, and means for securing a carriage to the horizontal support to hold the rescue basket. A rear mount is applicable over the rear wheel, the rear mount including a support for supporting the rescue basket.

In embodiments, the rear mount attaches to the pannier rack. The rear mount includes a base having a front end and an opposed rear end, a curved lip at the front end, configured to receive a crossbar of the pannier rack, and a latch plate under the rear end, configured to bind the pannier rack against the base of the rear mount. The rear mount includes a strap terminating in a clasp for securing against the rescue basket when the rescue basket is placed atop the support of the rear mount. The horizontal support of the forward mount includes an upstanding lip at one end and a catch lip at an opposing end. The catch lip includes an upstanding endwall and an overhanging lip projecting over the horizontal support. The forward mount includes a cam assembly and a latch on the cam assembly for securing the carriage to the forward mount when the carriage is placed atop the horizontal support of the forward mount.

The above provides the reader with a very brief summary of some embodiments described below. Simplifications and omissions are made, and the summary is not intended to limit or define in any way the disclosure. Rather, this brief summary merely introduces the reader to some aspects of some embodiments in preparation for the detailed description that follows.

BRIEF DESCRIPTION OF THE DRAWINGS

Referring to the drawings.

DETAILED DESCRIPTION

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 1:
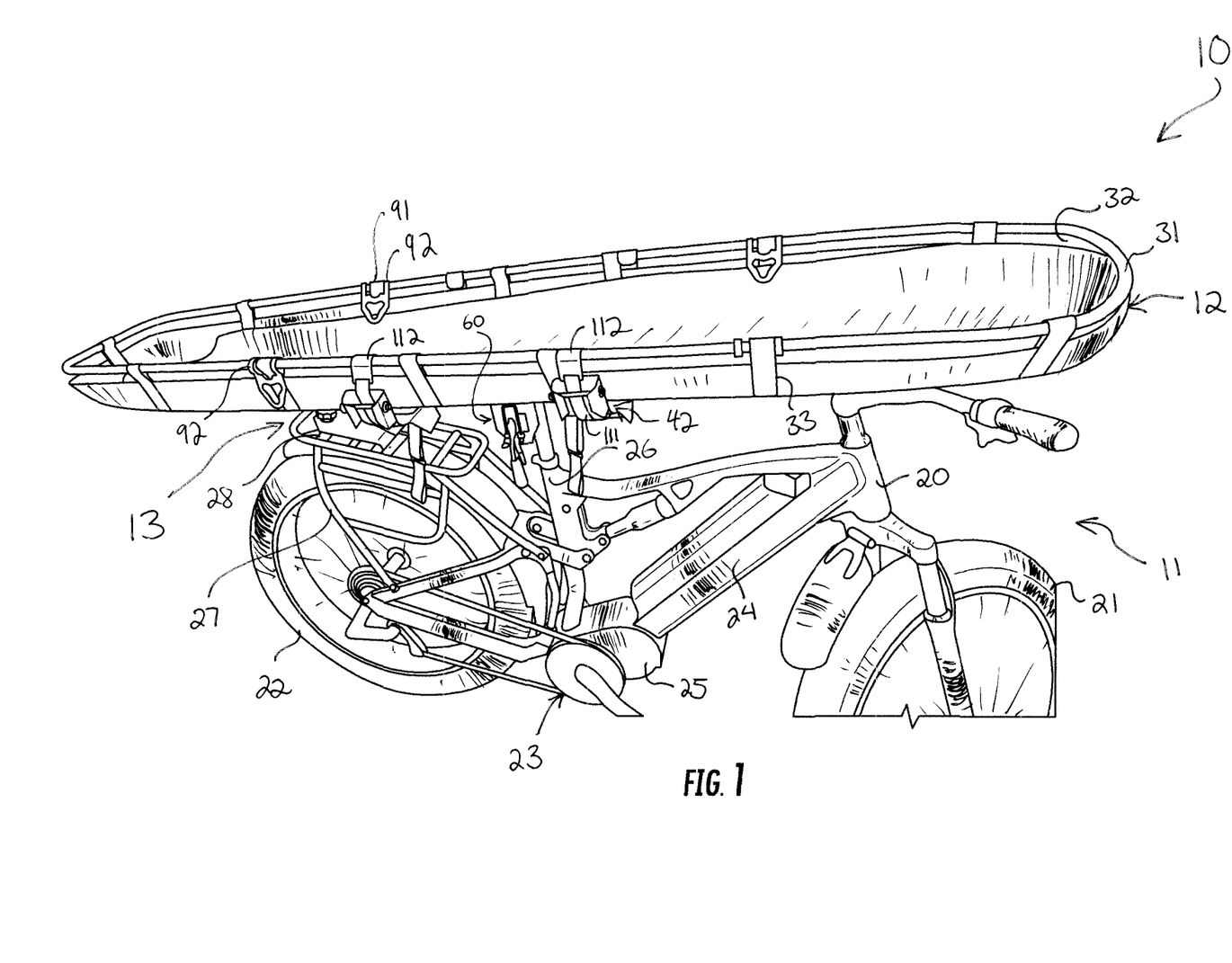
FIG. 1 is a perspective view of a bicycle rescue device including a bicycle, a rescue basket, and a mount kit having a forward mount, rear mount, and carriage.

FIG. 1 illustrates a bicycle rescue device 10 including a bicycle 11, a rescue basket 12, and a rescue basket mount kit 13 for carrying the rescue basket 12 on the bicycle 11. The bicycle rescue device 10 is useful for carrying the rescue basket 12 long distances over rugged terrain with great stability. The bicycle 11 has a bicycle frame 20 and front and rear wheels 21 and 22 mounted to the frame 20 for rolling, rotational movement. In this embodiment, the bicycle 11 has only front and rear wheels; in other embodiments, the bicycle 11 has other variations and numbers of wheels, such as a tricycle or quad-cycle. The bicycle 11 is displayed and described here without limitation for ease of discussion. The bicycle 11 has a drive assembly 23 including pedals, cranks, chainrings, a rear cassette, and a chain for driving the rear wheel 21 with human power. The bicycle 11 also has a battery 24 coupled to a motor 25 (concealed within a housing) which in turn is coupled to the drive assembly 23 to provide motor power to the rear wheel 21. In some embodiments, the bicycle 11 is equipped with the battery 24 and motor 25, while in other embodiments it does not. In other embodiments the bicycle 11 is purely motor powered. All combinations or permutations of these drive systems are considered to be included within the scope of this disclosure.

The bicycle frame 20 has a seat tube 26, which is a hollow tube extending generally upwardly from the bottom bracket proximate the cranks and motor 25. In some embodiments, the seat tube 26 is straight, while in other embodiments it is curved or bent, as shown in FIG. 1. The seat tube 26 is hollow and terminates in an open mouth, preferably encircled by or formed integrally with a collar having an adjustable diameter, so that the seat tube 26 can be tightened on a seat post applied to the seat tube 26. Often, a seat post will be inserted into the seat tube 26; a seat post is a post topped with a seat or saddle, upon which a person sits when riding the bicycle 11.

The bicycle 11 also has a pannier rack 27 over the rear wheel 22. The pannier rack 27 is a strong, rigid support for hanging bags over and to the side of the rear wheel 22. It includes vertical support bars up from the hub of the rear wheel 22 to a horizontal support platform having a plurality of crossbars 28. The pannier rack 27 is elevated above the rear wheel 22 and does not interfere with its rolling movement.

Still referring to FIG. 1, the rescue basket 12 is supported on the bicycle 11 and is designed to carry a supine patient. The rescue basket 12 includes a shallow, elongate basket 30, a tubular frame 31 elevated just above the basket 30 so that there is a gap 32 around the rescue basket 12 between the upper edge of the basket 30 and the frame 31. Rescuers can grasp the frame 31 with space to place their hands without impingement from the basket 30. The rescue basket 12 further includes a number of straps 33 for securing the patient in the basket 30.

Figure 2:
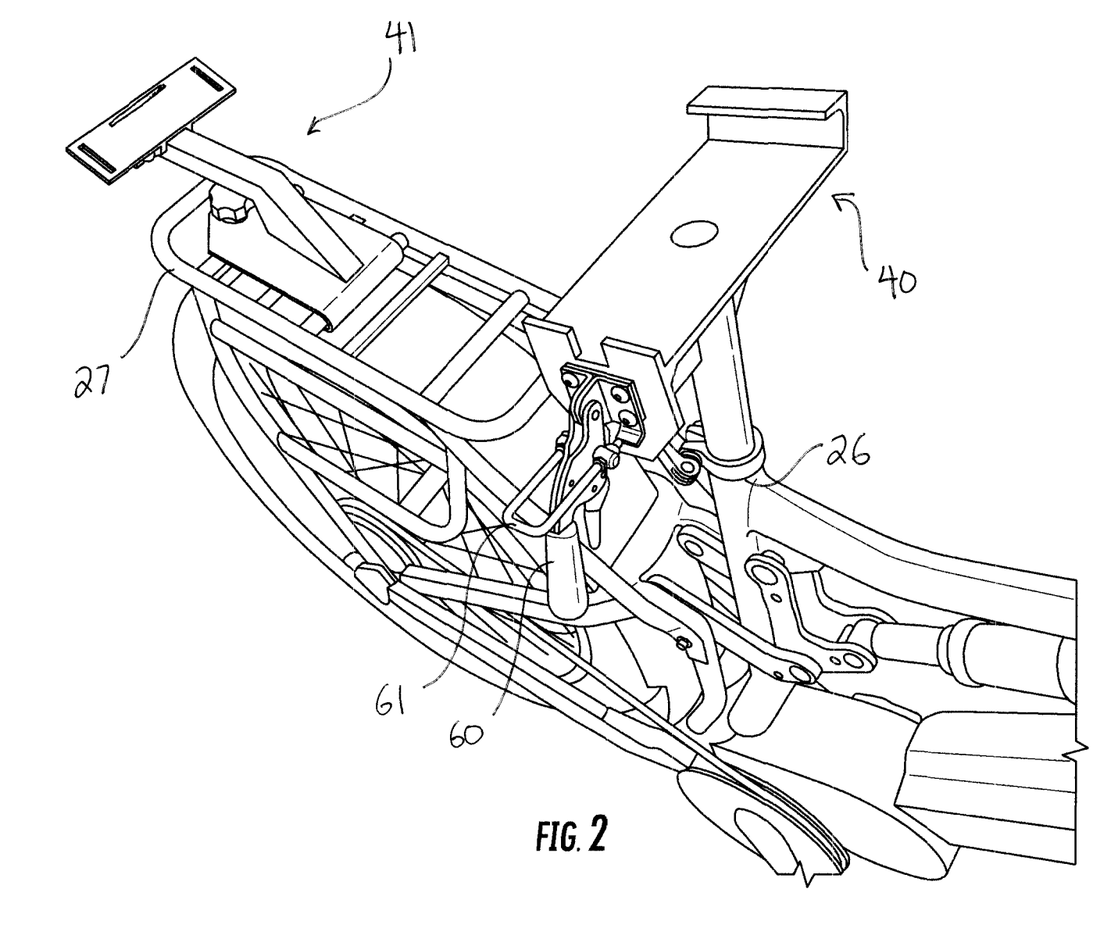
FIG. 2 is an enlarged view of the bicycle rescue device of FIG. 1, showing the forward and rear mounts of the mount kit.

The mount kit 13 securely attaches and supports the rescue basket 12 to the bicycle 11. Most of the mount kit 13 is clearly shown in FIG. 2. The mount kit 13 includes a first or forward mount 40 disposed in and over the seat tube 26 and a second or rear mount 41 disposed over the rear wheel 22. The mount kit 13 also includes a carriage 42, shown in FIGS. 5A, 5B, and 5C, which attaches to the forward mount 40 and holds the rescue basket 12. As can be seen in FIG. 2, the forward mount 40 fits into the seat tube 26 and is secured therein, while the rear mount 41 fits onto the pannier rack 27 and is securely attached thereto. In other embodiments, the forward mount 40 is fit into the stem or head tube of the bicycle 11 after the stem cap is removed.

Figure 3A:
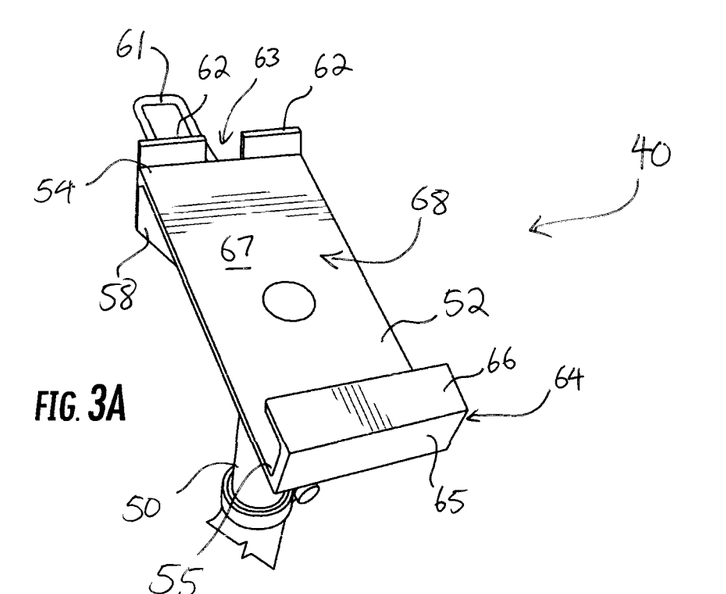
FIGS. 3A and 3B are top and bottom perspective views of the forward mount.
Figure 3B:
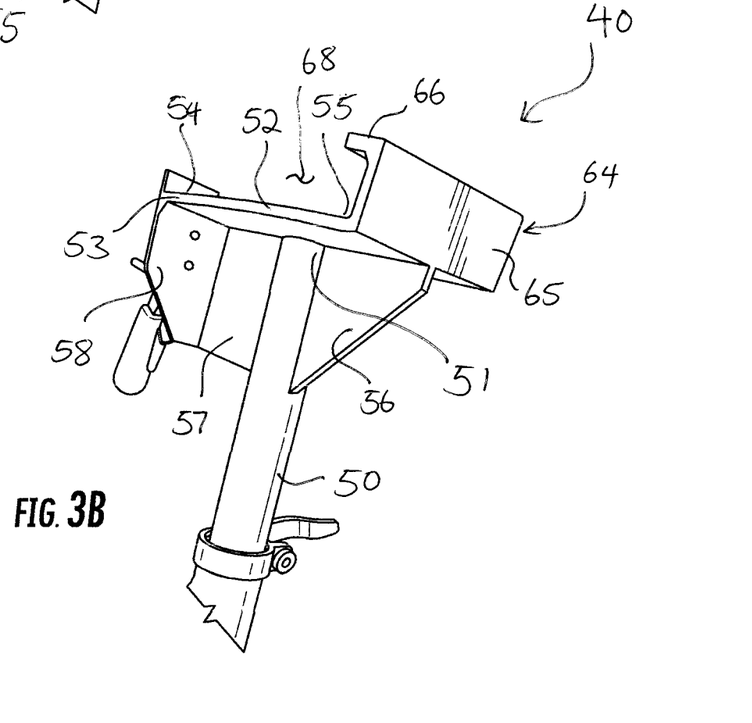

FIGS. 3A and 3B are top and bottom perspective views of the forward mount 40. The forward mount 40 is preferably installed on the bicycle frame 20 once the bicycle rescue device 10 has been ridden or transported to the patient's location. If a seat was previously installed on the bicycle rescue device 10 (so that someone could ride it), then the quick-release is undone and the seat and seat post are removed from the seat tube 26, leaving it open and available for the forward mount 40. The forward mount 40 includes various means for securing the carriage 42 with respect to the forward mount 40 when the carriage 42 is placed atop the forward mount 40. And since the carriage 42 carries the rescue basket 12, the forward mount 40 includes various means for securing the rescue basket 12 with respect to the forward mount 40.

The forward mount 40 includes a long, cylindrical seat post 50 extending from a bottom to a top 51. Preferably, the forward mount 40 is installed or applied to the bicycle frame 20 by sliding the seat post 50 into the seat tube 26 made ready by removal of a seat tube attached to a riding saddle. In other embodiments, the seat post 50 is permanently welded or an integral, unitary part of the seat tube 26, such that the forward mount is permanently fixed as part of the bicycle frame 20. A flat, horizontal support 52 is fixed to the top 51 of the seat post 50 and normal thereto. The support 52 includes a rugged, flat plate 53 with opposed lateral ends 54 and 55. A first brace 56 below the support 52 is fixed to the sidewall of the seat post 50 and extends upward to the underside of the support 52, proximate to the end 55. A second brace 57, opposite the first brace 56, is fixed to the sidewall of the seat post 50 and extends upward to the underside of the support 52, proximate to the end 54. The first and second braces 56 and 57 are each flat, thin, rugged sheets, preferably constructed from metal, welded or otherwise secured to both the seat post 50 and the underside of the support 52. The first and second braces 56 and 57 are coplanar with each other on opposed sides of the seat post 50.

Another thin, rugged sheet forms a platform 58 on the side of the forward mount 40. The platform 58 is secured to both the second brace 57 and the support 52 proximate the end 54. The platform 58 is normal to both the second brace 57 and the support 52, and is welded or otherwise securely attached to both. The platform 58 provides a mounting location for a cam assembly 60 including a latch 61 pivoted on the cam assembly 60, as shown in FIG. 2, which swings over and locks onto the carriage 42. The cam assembly 60 and latch 61 define means for securing the carriage 42 on the forward mount 40 and thus also defines means for securing the rescue basket with respect to the forward mount 40.

The platform 58 extends slightly upward beyond the support 52 with two projecting, upstanding lips 62. The lips 62 are rectangular and terminate at a common height. The lips 62 are spaced apart by a central gap 63 extending from that common height to the support 52. The lips 62 define means for securing the carriage 42 on the forward mount 40 and therefore also define means for securing the rescue basket 12 with respect to the seat post 50.

Opposite the platform, the end 55 of the support 52 has a catch lip 64. The catch lip 64 defines means for securing the carriage 42 on the forward mount 40 and defines means for securing the rescue basket 12 with respect to the seat post 50. The catch lip 64 includes an upstanding endwall 65 which is contiguous to the support 52. The catch lip 64 rises to a height which is greater than the height of the opposed lips 62 on the opposite end 54 of the support 52. The catch lip 64 turns inwardly at an approximately right angle into an overhanging lip 66. The overhanding lip 66 projects back out over the support 52. The catch lip 64 is preferably integral, unitary, and monolithic to the support, as are the lips 62. The support 52 has an upper, horizontal support surface 67 which cooperates with the lips 62 and the catch lip 64 to define a receiving space or hold 68 above the support 52.

The hold 68 is sized, shaped, and generally configured to receive and carry the carriage 42. In the embodiment shown herein, the support surface 67 is a flat upper surface of the platform 58 which is normal to the seat post 50, and so the support surface 67 defining the lower boundary of the hold 68 is also normal to the seat post 50. In other embodiments, the platform 58, the support surface 67, and the hold 68 have other arrangements with respect to the seat post 50. The hold 68 defines means for securing the carriage 42 on the forward mount 40 and thus for securing the rescue basket 12 with respect to the support surface 67. The forward mount 40 is preferably constructed from a strong, rugged, and durable material or combination of materials, such as steel, aluminum, titanium, or other metals.

Figure 4A:
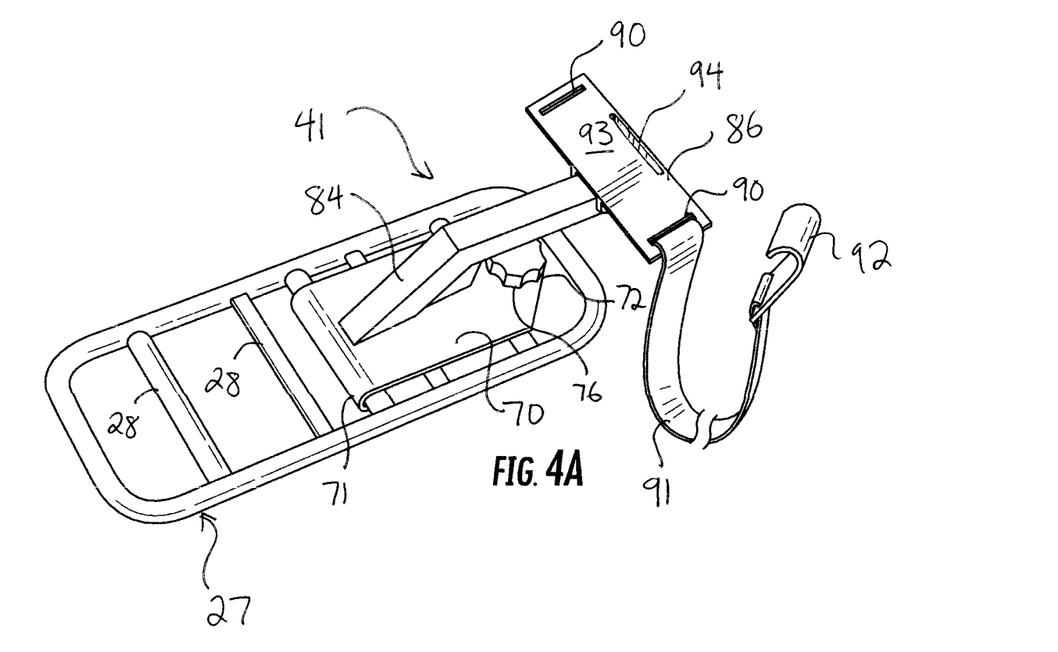
FIGS. 4A and 4B are top and bottom side perspective views of the rear mount.
Figure 4B:
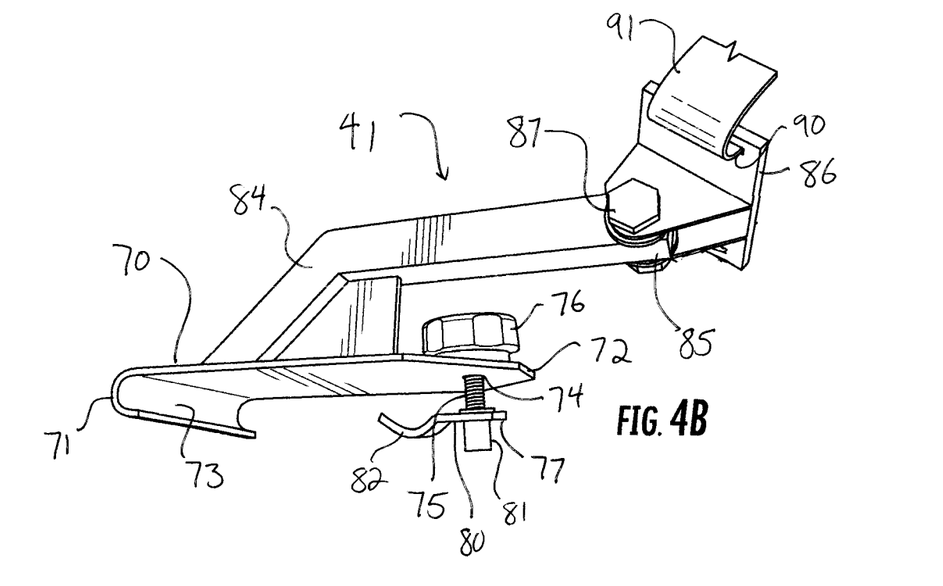

Turning now to FIGS. 4A and 4B, the rear mount 41 is shown. In FIG. 4A, the rear mount 41 is shown secured to the crossbars 28 of the upper platform of the pannier rack 27. In other embodiments, the rear mount 41 is attached directly to the seat stays, chain stays, or the hub of the rear wheel 22 of the bicycle 11. In this embodiment, the rear mount 41 includes a base 70. The base 70 is a low, relatively flat but strong sheet of material, such as metal, having a front end 71 and an opposed rear end 72. The front end 71 is formed with a curved, overhanging catch or lip 73 across its entire width. The lip 73 is sized and shaped to closely correspond to and snugly fit over the crossbars 28 of the pannier rack 27 to catch and hold the crossbars 28. From the lip 73, the base 70 extends rearwardly to the rear end 72 where it tapers to a truncated tail. A hole 74 extends through the center of this tail, and a threaded shank 75 is fit through the hole 74. One end of the shank 75 has an enlarged head or knob 76, and the other carries a latch plate 77.

The latch plate 77 has a flat end 80 with a post 81 carrying internal threads complementally engaged on the threaded shank 75. The latch plate 77 extends from the flat end 80 forwardly to include an arcuate front end 82. The front end 82 bends away from the plane of the flat end 80 and then back toward it. This bend is size and shaped to correspond to the outer diameter of the crossbars 28 such that the front end 82 snugly fits over one of the crossbars 28. When so fit, a user rotates the knob 76 to shorten the effective length of the shank 75 and thereby draw the post 81 up toward the base 70. This causes the front end 82 to clamp onto the crossbar 28, seizing it between the front end 82 and the underside of the base 70 securely.

An arm 84 rises upwardly and rearwardly from the upper surface of the base 70. The arm 84 adopts an angular orientation up from the base 70 then turns at an elbow and adopts a roughly parallel orientation with respect to the base 70. The arm 84 projects from the base 70 to a free end 85 of the arm 84. A support 86 is coupled to the free end 85 for pivotal movement with a bolt attachment 87. In the embodiment shown in FIGS. 4A and 4B, the support 86 is rectangular and flat, having two opposed ends through which slots 90 are formed. An optional third slot 94 is formed along the back of the support 86, between the slots 90. That third slot 94 is shown empty in FIG. 4A. A ratchet strap or other strap 91 is threaded through one of the opposed side slots 90. The strap 91 is secured at the slot 90 and extends to a free end carrying a hook or clasp 92. The top of the support 86, between the slots 90, presents an upper support surface 93 configured to receive the underside of the rescue basket 12. In some embodiments, the clasp 92 is wrapped around the rescue basket 12 and coupled to the opposite, open slot 90. In other embodiments, the clasp 92 is attached to one side of the rescue basket 12, and another strap 91 is secured in the slot 90 and coupled to the other side of the rescue basket 12. In embodiments with the third slot 94, a strap 91 (similar to the one passed through the side slot 90 having a clasp 92) is secured to the slot 94 and its clasp 92 is passed over the end of the rescue basket 12. In all of these embodiments, the strap 91 and clasp 92 define means for securing the rescue basket 12 against the support surface 93 and with respect to the rear mount 41, when the rescue basket 12 is placed atop the support surface 93. In other embodiments, instead of straps 91 and clasps 92, other means for securing are contemplated, including: T-pins, quick release pins, ball lock pins, pipe clamps with and without thumb or set screws, pipe mounts, adjustable ratcheting jaw grips, over-center ratchets and latches, band clamps, C clamps, various handlebar-style clamp mounts, and axle pegs.

Figure 5A:
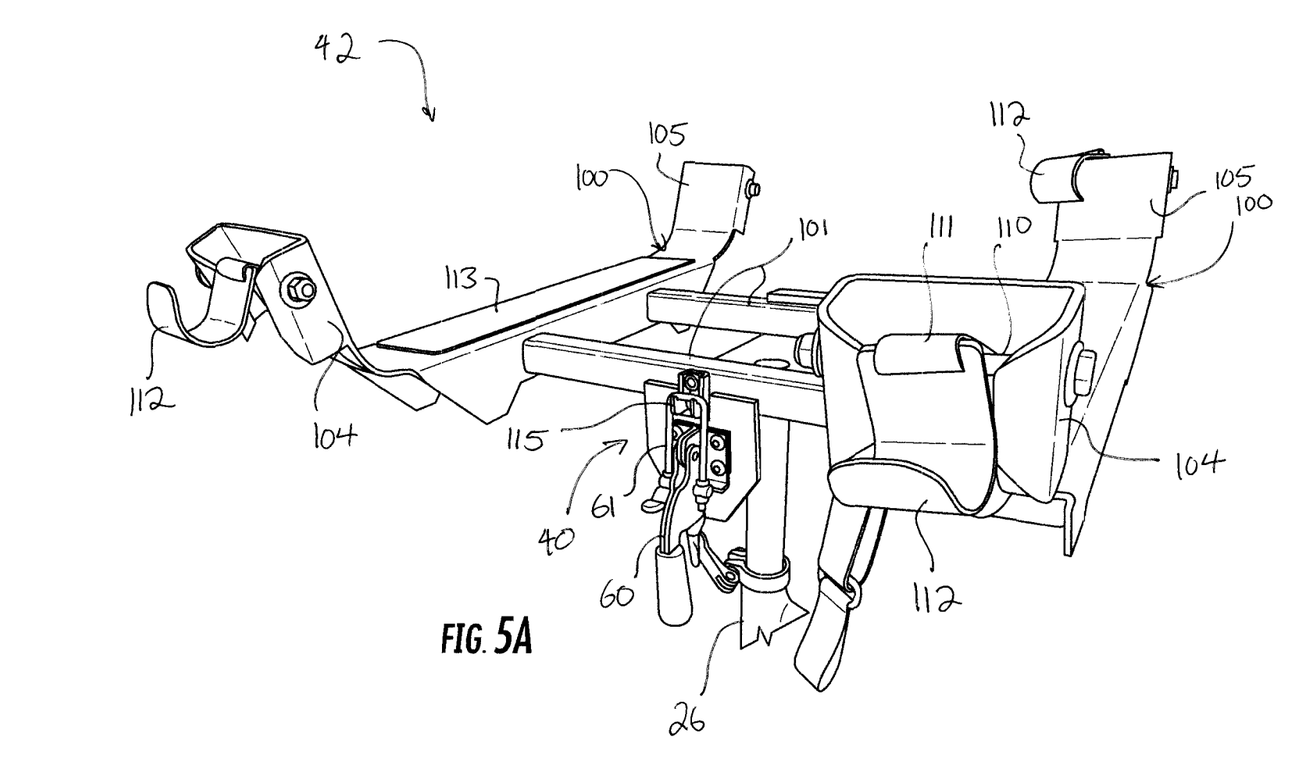
FIGS. 5A, 5B, and 5C are side, top, and bottom perspective views of the carriage for application to the forward mount.
Figure 5B:
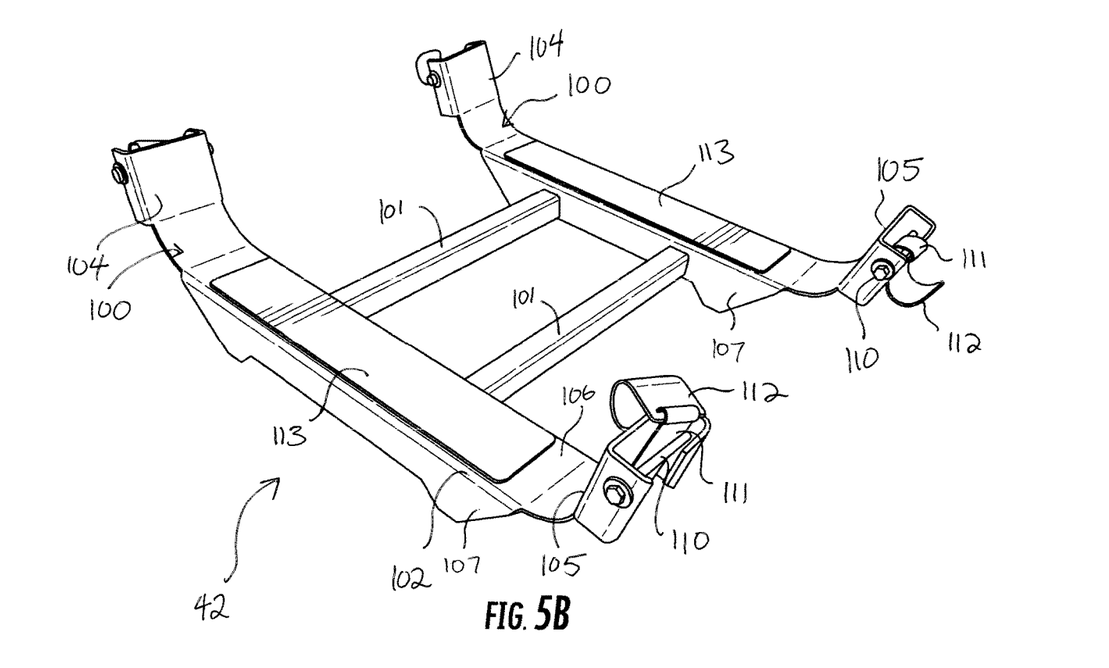
Figure 5C:
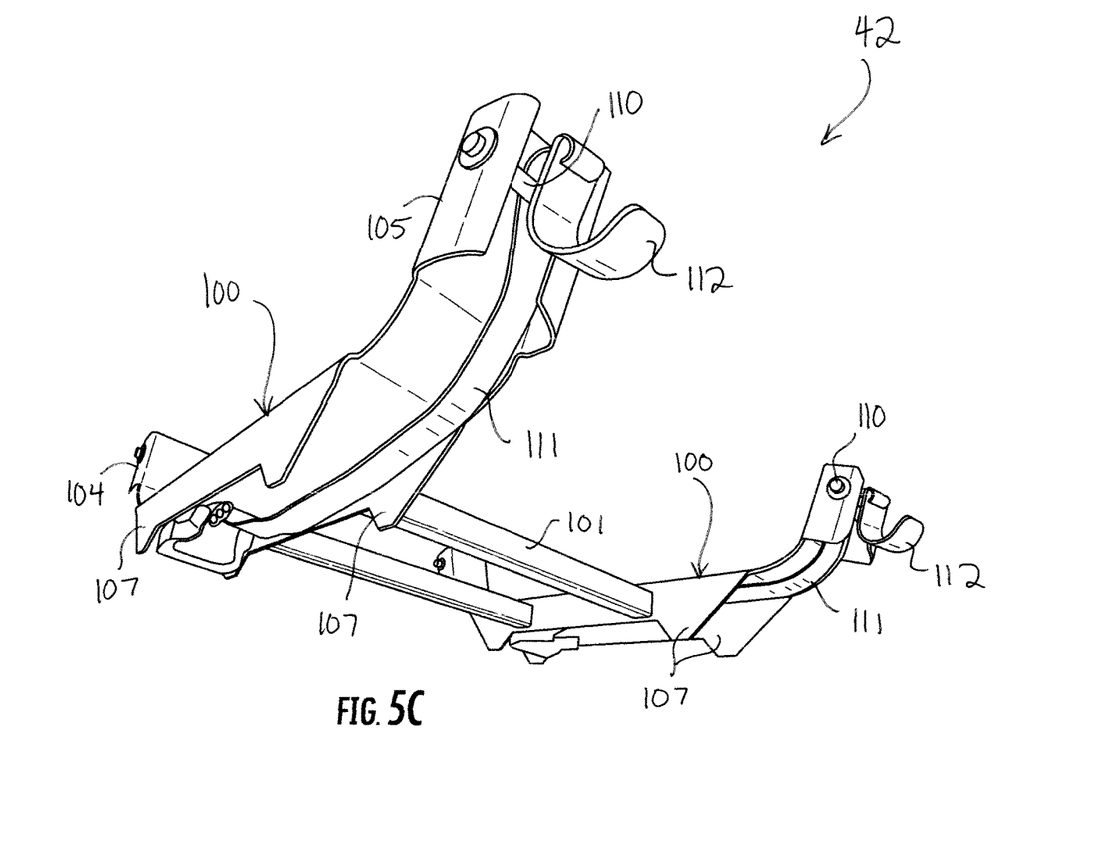

While the rescue basket 12 rests directly on the upper support surface 93 of the rear mount 41, the carriage 42 must first be applied to the forward mount 40. FIGS. 5A, 5B, and 5C show the carriage 42 in detail, from three perspectives. FIG. 5A is a side perspective view showing the carriage 42 carried in the forward mount 40, which in turn is secured in the seat tube 26. FIG. 5B shows the carriage 42 in isolation from a top perspective. FIG. 5C shows the carriage 42 in isolation, but from a lower perspective.

The carriage 42 includes two opposed, spaced-apart bunks 100 connected by two rigid spars 101. The spars 101 are rectangular, structural, rigid beam elements and are welded or otherwise secured permanently to the bunks 100. The bunks 100 are also rigid and strong for holding the rescue basket 12. The bunks 100 are identical in every respect except for location and as such only one is described here with the understanding that the description applies equally to both. Bunk 100 has a generally U-shaped body 102 including a central support base 103 and two opposed support sides 104 and 105. The support base and sides 103, 104, and 105 are unitary and monolithic, formed as a single integral piece. The support base 103 includes a flat, upper support surface 106 and opposed sidewalls 107 depending downward from the upper surface 106. The support base 103 curves upwardly at the opposed ends of the bunk 100 to form the support sides 104 and 105. In the embodiment shown in FIGS. 5A and 5B, the sidewalls 107 terminate short of the support sides 104 and 105, but in other embodiments, the sidewalls 107 also continue to form the supports sides 104 and 105. Instead, in the embodiment of FIGS. 5A-5C, the support sides are formed with tabs which are turned back so that a bolt 110 is passed through two opposed holes in the tabs. A strap 111 is threaded behind the bolt 110 and across the underside of the bunk 100 to the other support side (as shown in FIG. 5C), where the strap 111 is threaded behind another bolt 110. Both ends of the strap 111 carry a clasp 112. The straps 111 and clasps 112 define means for securing the rescue basket 12 in the carriage 42; since the carriage 42 is carried in the forward mount 40, the straps 11 and clasps 112 also define means for securing the rescue basket 12 with respect to the forward mount 40. In other embodiments, instead of straps 11 and clasps 112, other means for securing are contemplated, including: T-pins, quick release pins, ball lock pins, pipe clamps with and without thumb or set screws, pipe mounts, adjustable ratcheting jaw grips, over-center ratchets and latches, band clamps, C clamps, various handlebar-style clamp mounts, and axle pegs.

When the rescue basket 12 is placed onto the carriage 42, the clasps 112 are hooked over the opposed sides of the tubular frame 31 and each strap 111 is tightened. In the embodiment shown in FIGS. 5A-5C, the support surface 106 carries a tacky, slightly compressible pad 113. When the straps 111 are tightened, the rescue basket 12 is pulled down onto the pads 113, compressing them slightly and preventing the rescue basket 12 from moving with respect to the carriage 42. The support sides 104 and 105 further limit lateral movement of the rescue basket 12 with respect to the carriage 42.

Turning now just to FIG. 5A, there is a hook 115 on the side of one of the spars 101. The hook 115 is actually two hook-shaped projects mounted to the spar 101. The hook 115 projects outwardly and then upwardly, in the same direction as the support sides 104 and 105. To secure the carriage 42 in the forward mount 40, the spars 101 are slipped into the hold 68 and nested in juxtaposition against and between the lips 62 and the catch lip 64. The spars 101 are received in contact against the upper support surface 67 of the support 52. The hook 115 projects through the central gap 63 between the lips 62 and is available for the latch 61. The user raises the handle of the cam assembly 60 to allow the latch 61 to be pivoted up; the user then slips the latch 61 over the hook 115 and pulls the handle of the cam assembly 60 down, thereby binding the latch 61 against the hook 115. This prevents the carriage 42 from rising up from the forward mount 40. The lips 62 and the catch lip 64 prevents the carriage 42 from moving laterally, and the binding of the latch 61 against the hook 115 prevents forward-rearward movement of the carriage 42 with respect to the forward mount 40. In this way, the carriage 42 is securely mounted to the bicycle 11 and ready to receive the rescue basket 12.

Similarly, when the knob 76 of the rear mount 41 is tightened, the rear mount 41 is bound to the pannier rack 27. This prevents the rear mount 41 from moving vertically, laterally, or forwardly or rearwardly with respect to the pannier rack 27. The support 86 is thus available to receive the rescue basket 12.

In operation, after the rescue workers stabilize a patient within the rescue basket 12, they lift the rescue basket on top of the bicycle 11. The rescue workers place the rescue basket 12 atop the carriage 42 and the rear mount 41. Preferably, they locate the rescue basket 12 as shown in FIG. 1, with approximately the middle of the rescue basket 12 over the carriage 42 and the rear of the rescue basket 12 over the rear mount 41. This places the center of the rescue basket 12 over the seat tube 26 of the bicycle. The center of gravity of the patient will generally be at or near the center of the rescue basket 12, and so positioning the center of the rescue basket 12 over the seat tube 26 mimics the way the bicycle 11 generally carries weight when someone is riding it. This also leaves the handlebars of the bicycle 11 free and unrestricted in movement; a rescue worker can steer the bicycle 11 by reaching his arms under the rescue basket 12 and holding the handlebars.

Once the rescue basket 12 is so positioned, the rescue workers secure it. They secure it first to the carriage 42 or to the rear mount 41, in either order. They secure the rescue basket 12 to the rear mount 41 by slipping the clasps 92 over the frame 31 of the rescue basket 12 and tightening the straps 91 for the clasps 92. This pulls the clasps 92 down on the rescue basket 12, binding its underside to the upper support surface 93 of the rear mount 41. They secure the rescue basket to the carriage 42 by slipping the clasps 112 over the frame 31 of the rescue basket 12 and tightening the straps 111 for the clasps 112, thereby pulling the clasps 112 down and binding the rescue basket 12 against the pads 113 on the supports bases 103 of the bunks 100.

When so secured, the rescue workers can escort the bicycle rescue device 10 through the wilderness to an exfiltration point, such as a road or clearing accessible to ambulance or helicopter. Rescue workers can walk on the side of the bicycle rescue device 10 to balance and support it, and another rescue worker can direct the bicycle rescue device 10 with the handlebars. On embodiments which have a motor 25, there is often also a throttle located on the handlebars; the rescue worker steering the bicycle rescue device 10 can control the throttle to assist the workers in navigating terrain.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A bicycle rescue device, comprising:
 a bicycle frame and front and rear wheels mounted for rotation thereto, the bicycle frame comprising a seat tube;
 a first mount received in the seat tube, and a carriage mounted in the first mount, wherein the carriage is configured to hold a rescue basket, and the first mount comprises a seat post, a first support surface fixed normal to the seat post, and means for securing a carriage against the first support surface when the carriage is placed atop the first support surface, the carriage configured to carry the rescue basket; and
 a second mount disposed over the rear wheel, the second mount presenting an upper support surface and including straps for securing the rescue basket;
 wherein the means for securing the carriage comprises a catch lip on one end of the first support surface and a latch on an opposed end of the first support surface, the latch pivoted on a cam assembly.

2. The bicycle rescue device of claim 1, wherein the bicycle frame carries a motor for driving at least one of the front and rear wheels.

3. The bicycle rescue device of claim 1, wherein the means for securing the carriage further comprises an upstanding lip on an opposing end of the first support surface, the lip defining a gap through which the latch pivots on the cam assembly.

4. The bicycle rescue device of claim 1, wherein the means for securing the carriage further comprises an upstanding lip at an opposing end of the first support surface, cooperating with the catch lip and the first support surface to define a hold for receiving the carriage on the first mount.

5. The bicycle rescue device of claim 1, wherein the carriage includes two opposed, spaced-apart bunks, each bunk comprising a U-shaped body having a support base and opposed support sides extending upwardly from the support base.

6. A rescue basket mount kit for mounting to a bicycle and carrying a rescue basket thereon, the bicycle including a seat tube and a pannier rack, and the mount kit comprising:
 a first mount comprising a seat post, a first support surface fixed to the seat post and normal thereto and including an upstanding lip at one end and a catch lip at an opposing end, and first means for securing the rescue basket with respect to the first support surface; and
 a second mount comprising a base having a catch to engage the pannier rack, a second support surface, and second means for securing the rescue basket against the second support surface.

7. The rescue basket mount kit of claim 6, wherein the second mount includes:
 a base having a front end and an opposed rear end;
 a curved lip at the front end defining the catch, configured to receive a crossbar of the pannier rack; and
 a latch plate under the rear end, configured to bind the pannier rack against the base of the second mount.

8. The rescue basket mount kit of claim 6, wherein the second means includes a strap terminating in a clasp for securing against the rescue basket when the rescue basket is placed atop the second support surface.

9. The rescue basket mount kit of claim 6, wherein the catch lip includes an upstanding endwall and an overhanging lip projecting over the first support surface.

10. The rescue basket mount kit of claim 6, wherein the first means includes a cam assembly and a latch on the cam assembly for securing a carriage to the first mount when the carriage is placed atop the first support surface of the first mount, the carriage configured to hold the rescue basket.

11. A bicycle rescue device for carrying a rescue basket on a bicycle frame having a seat post, a pannier rack, and being supported on at least a front wheel and a rear wheel, the bicycle rescue device comprising:
 a forward mount applicable to the seat tube, wherein the forward mount includes a seat post, a horizontal support for supporting the rescue basket, and means for securing a carriage to the horizontal support to hold the rescue basket; and
 a rear mount applicable over the rear wheel, the rear mount including a support for supporting the rescue basket, the rear mount including a base having a front end and an opposed rear end, a curved lip at the front end configured to receive a crossbar of the pannier rack, and a latch plate under the rear end configured to bind the pannier rack against the base of the rear mount.

12. The bicycle rescue device of claim 11, wherein the rear mount attaches to the pannier rack.

13. The bicycle rescue device of claim 12, wherein the rear mount includes a strap terminating in a clasp for securing against the rescue basket when the rescue basket is placed atop the support of the rear mount.

14. The bicycle rescue device of claim 11, wherein the horizontal support of the forward mount includes an upstanding lip at one end and a catch lip at an opposing end.

15. The bicycle rescue device of claim 14, wherein the catch lip includes an upstanding endwall and an overhanging lip projecting over the horizontal support.

16. The bicycle rescue device of claim 14, wherein the forward mount includes a cam assembly and a latch on the cam assembly for securing the carriage to the forward mount when the carriage is placed atop the horizontal support of the forward mount.

* * * * *